(12) United States Patent
Jeong et al.

(10) Patent No.: US 11,299,565 B2
(45) Date of Patent: Apr. 12, 2022

(54) METHOD OF PREPARING CONJUGATED DIENE-BASED POLYMER AND APPARATUS FOR PREPARING CONJUGATED DIENE-BASED POLYMER

(71) Applicant: LG Chem, Ltd., Seoul (KR)

(72) Inventors: Hoi In Jeong, Daejeon (KR); Jun Seok Ko, Daejeon (KR); Woo Sung Hwang, Daejeon (KR); Dong Min Kim, Daejeon (KR); Jeong Seok Lee, Daejeon (KR)

(73) Assignee: LG Chem, Ltd.

( * ) Notice: Subject to any disclaimer, the term of this patent is extended or adjusted under 35 U.S.C. 154(b) by 380 days.

(21) Appl. No.: 16/489,544

(22) PCT Filed: Jan. 11, 2019

(86) PCT No.: PCT/KR2019/000447
§ 371 (c)(1),
(2) Date: Aug. 28, 2019

(87) PCT Pub. No.: WO2019/156375
PCT Pub. Date: Aug. 15, 2019

(65) Prior Publication Data
US 2019/0389984 A1    Dec. 26, 2019

(30) Foreign Application Priority Data

Feb. 9, 2018 (KR) .................. 10-2018-0016065

(51) Int. Cl.
*C08F 36/04* (2006.01)
*C08F 2/01* (2006.01)
(Continued)

(52) U.S. Cl.
CPC ............ *C08F 36/04* (2013.01); *C08F 2/01* (2013.01); *C08F 2/04* (2013.01); *C08F 4/52* (2013.01); *C08F 4/619* (2013.01); *B01D 3/14* (2013.01)

(58) Field of Classification Search
USPC ............................................ 526/65; 528/501
See application file for complete search history.

(56) References Cited

U.S. PATENT DOCUMENTS

2011/0218300 A1    9/2011    Thiele et al.
2011/0257342 A1    10/2011   Paul et al.
(Continued)

FOREIGN PATENT DOCUMENTS

CN    1309674 A      8/2001
CN    107466299 A    12/2017
(Continued)

OTHER PUBLICATIONS

Extended European Search Report for Application No. EP 19751413.6 dated Feb. 21, 2020, 7 pages.
(Continued)

*Primary Examiner* — Fred M Teskin
(74) *Attorney, Agent, or Firm* — Lerner, David, Littenberg, Krumholz & Mentlik, LLP

(57) ABSTRACT

A method of preparing a conjugated diene-based polymer is provided including: a step of polymerizing a first conjugated diene-based monomer in solution in a first polymerization reactor to prepare a first polymer solution including a first conjugated diene-based polymer; a step of polymerizing a second conjugated diene-based monomer in solution in a second polymerization reactor to prepare a second polymer solution including a second conjugated diene-based polymer; a step of supplying a first fluid separated from the first polymer solution to a first purification unit and purifying the
(Continued)

first fluid; and a step of supplying a second fluid separated from the second polymer solution to a second purification unit and purifying the second fluid. An apparatus for preparing a conjugated diene-based polymer is also provided.

13 Claims, 2 Drawing Sheets

(51) Int. Cl.
*C08F 4/52* (2006.01)
*C08F 4/619* (2006.01)
*C08F 2/04* (2006.01)
*B01D 3/14* (2006.01)

(56) References Cited

U.S. PATENT DOCUMENTS

| | | |
|---|---|---|
| 2013/0189852 A1 | 7/2013 | Yoshihara et al. |
| 2013/0341567 A1 | 12/2013 | Hyde et al. |
| 2016/0002370 A1 | 1/2016 | Price et al. |
| 2016/0229930 A1 | 8/2016 | Price et al. |
| 2018/0037683 A1 | 2/2018 | Hwang et al. |
| 2018/0051108 A1 | 2/2018 | Hwang et al. |
| 2018/0319949 A1 | 11/2018 | Lee et al. |

FOREIGN PATENT DOCUMENTS

| | | |
|---|---|---|
| JP | S575706 A | 1/1982 |
| JP | 2010235751 A | 10/2010 |
| JP | 2012508305 A | 4/2012 |
| JP | 2014507548 A | 3/2014 |
| JP | 2017128711 A | 7/2017 |
| KR | 20110040839 A | 4/2011 |
| KR | 20130086557 A | 8/2013 |
| KR | 20150132294 A | 11/2015 |
| KR | 20160058143 A | 5/2016 |
| KR | 20170047031 A | 5/2017 |
| KR | 20170047032 A | 5/2017 |
| KR | 20170050004 A | 5/2017 |
| KR | 20170053467 A | 5/2017 |
| KR | 20170141872 A | 12/2017 |
| WO | 2017108963 A1 | 6/2017 |
| WO | 2017217708 A1 | 12/2017 |

OTHER PUBLICATIONS

Database WPI, Week 201739, Thomson Scientific, London, GB, AN 2017-31697H, XP002797516.
Chinese Search Report for Application No. 201980001546, dated Jul. 21, 2021, 2 pages.
International Search Report for Application No. PCT/KR2019/000447, dated Apr. 23, 2019, pp. 1-2.

METHOD OF PREPARING CONJUGATED DIENE-BASED POLYMER AND APPARATUS FOR PREPARING CONJUGATED DIENE-BASED POLYMER

CROSS-REFERENCE TO RELATED APPLICATIONS

The present application is a national stage entry under 35 U.S.C. § 371 of PCT/KR2019/000447 filed on Jan. 11, 2019, which claims priority to Korean Patent Application No. 10-2018-0016065, filed on Feb. 9, 2018, the disclosures of which in their entirety are incorporated herein as a part of the specification.

TECHNICAL FIELD

The present invention relates to a method of preparing a conjugated diene-based polymer, and more particularly, to a method of preparing a conjugated diene-based polymer and an apparatus for preparing a conjugated diene-based polymer for carrying out the method.

BACKGROUND ART

A preparation process of a synthetic rubber prepared by solution polymerization includes a purification process for removing unreacted monomers and impurities (C4s, water, heavies, and the like) from a solvent, for reusing the solvent used in the reaction.

Among the impurities, water is introduced from a process for separating a polymer and a solvent which is a previous step of the purification process, for example, stripping or devolatilization washing. When water is input to the reaction process, water acts as a serious catalytic poison depending on a synthetic rubber product to decrease catalytic activity and to form a gel, resulting in a decrease in production days due to degradation of physical properties of the synthetic rubber and fouling of a reactor, and thus, must be removed. In addition, among the impurities, C4 impurities, for example, butenes serve as a catalytic poison or a molecular weight adjusting agent to affect the physical properties of synthetic rubber, when being input together with a conjugated diene-based monomer such as 1,3-butadiene which is a monomer used for preparation of a conjugated diene-based polymer, whereby it is necessary to minimize the content of the impurities in a solvent.

Meanwhile, the synthetic rubber prepared by solution polymerization includes products which are vulnerable to impurities, for example, solution styrene butadiene rubber (SSBR) using an alkali metal compound such as lithium as a catalyst, neodymium butadiene rubber (NdBR) using a lanthanide rare earth element compounds such as neodymium as a catalyst, or the like. In addition, there are products which are relatively less vulnerable to impurities, for example, nickel butadiene rubber (NiBR) using a transition metal compound such as nickel as a catalyst. Thus, at each time of the solution polymerization, purification is performed with different purity of the solvent to be used.

In this regard, in the conventional purification process of the solvent, a distillation column is used, and in a first column, an unreacted monomer, water and butenes forming an azeotrope are removed from the upper portion and a solvent including a part of C4s (unreacted monomer and butenes) and water is recovered from the lower portion, and then the solvent recovered from the lower portion is input to a second column to remove heavies. This purification process has no problem when manufacturing synthetic rubber products which are less vulnerable to impurities (such as NiBR); however, when manufacturing synthetic rubber products which are vulnerable to impurities (such as SSBR or NdBR), the activity of the catalyst to be used is decreased due to the impurities contained in the solvent, and gel production is increased.

Thus, there is a method, in which in order to lower a content of butenes and moisture in the purified solvent, a part of the solvent is removed from the upper portion of the first column together with an unreacted monomer, water, and butenes forming an azeotrope in the first column, thereby recovering a solvent from which light impurities are almost removed from the lower portion of the first column. In this case, a loss of the solvent removed from the upper portion of the first column occurs which increases the cost, or an additional column for recovering the solvent is needed which increases the investment cost, and variables in process management are increased which increases operator's fatigue.

DISCLOSURE

Technical Problem

In order to solve the problems mentioned in the above background art, a problem to be solved in the present invention is to utilize the conventional apparatus for preparation when preparing the conjugated diene-based polymer using solution polymerization, while recovering and reusing a high-purity solvent, thereby preventing a side effect in a reaction process due to the reusable solvent and preventing a loss of the solvent due to the purification process of the solvent, thereby improving productivity of the conjugated diene-based polymer.

That is, the present invention has been conceived for solving the problems of the prior art, and an object of the present invention is to provide a method of preparing a conjugated diene-based polymer in which a conjugated diene-based polymer which is vulnerable to impurities, and a conjugated diene-based polymer which is relatively less vulnerable to impurities, are polymerized, respectively, and then when each of the solvents separated from each of the polymer solutions is purified, the high-purity solvent used in the preparation of the conjugated diene-based polymer which is vulnerable to impurities, is efficiently recovered and reused, thereby preventing a side effect in the reaction process due to the reusable solvent, preventing the loss of the solvent in the purification process of the solvent, and improving reactivity in the preparation of the polymer due to the use of the high-purity solvent, resulting in reduction of a catalyst amount and a decrease in a gel production amount to have improved productivity, and an apparatus for preparing a conjugated diene-based polymer for carrying out the method.

Technical Solution

In one general aspect, a method of preparing a conjugated diene-based polymer includes: a step of polymerizing a first conjugated diene-based monomer in solution in a first polymerization reactor to prepare a first polymer solution including a first conjugated diene-based polymer (S10); a step of polymerizing a second conjugated diene-based monomer in solution in a second polymerization reactor to prepare a second polymer solution including a second conjugated diene-based polymer (S20); a step of supplying a first fluid separated from the first polymer solution to a first purification unit and purifying the first fluid (S30); and a step of supplying a second fluid separated from the second polymer solution to a second purification unit and purifying the second fluid (S40), wherein the first purification unit is provided with a first feed tank, a first column connected to the first feed tank, and a first' column connected to the first column, the second purification unit is provided with a second feed tank, a second column connected to the second feed tank, and a second' column connected to the second column, a fluid discharged from an upper portion of the first column is supplied to the second feed tank, and the first feed tank is supplied with a third fluid from the second feed tank.

In another general aspect, an apparatus for preparing a conjugated diene-based polymer includes: an apparatus for preparing a first conjugated diene-based polymer including a first polymerization reactor for polymerizing a first conjugated diene-based polymer in solution and a first purification unit for purifying a first fluid separated from a first polymer solution prepared in the first polymerization reactor; and an apparatus for preparing a second conjugated diene-based polymer including a second polymerization reactor for polymerizing a second conjugated diene-based polymer in solution and a second purification unit for purifying a second fluid separated from a second polymer solution prepared in the second polymerization reactor, wherein the first purification unit includes a first feed tank, a first column connected to the first feed tank, and a first' column connected to the first column, the second purification unit includes a second feed tank, a second column connected to the second feed tank, and a second' column connected to the second column, an upper portion of the first column is connected to the second feed tank by a connecting pipe for supplying a fluid discharged from the upper portion of the first column to the second feed tank, and the second feed tank is connected to the first feed tank by a connecting pipe for supplying a third fluid to the first feed tank.

Advantageous Effects

Use of the method of preparing a conjugated diene-based polymer and the apparatus for preparing the same according to the present invention allows, when preparing the conjugated diene-based polymer using solution polymerization, utilization of the conventional apparatus for preparation, while recovering and reusing a high-purity solvent, thereby having an effect of preventing a side effect in a reaction process due to the reusable solvent and preventing a loss of the solvent due to the purification process of the solvent to improve productivity of the conjugated diene-based polymer.

BEST MODE

The terms and words used in the description and claims of the present invention are not to be construed as a general or dictionary meaning but are to be construed as meaning and concepts meeting the technical ideas of the present invention based on a principle that the inventors can appropriately define the concepts of terms in order to describe their own inventions in the best mode.

Hereinafter, the present invention will be described in more detail for understanding the present invention.

In the present invention, the term, "C4s" may refer to a hydrocarbon compound having 4 carbon atoms, or may refer to, as a specific example, all inclusive of butane as a saturated hydrocarbon and isomers thereof, butene as an unsaturated hydrocarbon and isomers thereof, and 1,3-butadiene among unreacted monomers.

In the present invention, the term, "butenes" may refer to butene as an unsaturated hydrocarbon having 4 carbon atoms and isomers thereof.

In the present invention, the term, "fluid" may refer to both gas and liquid produced or discharged in/from each step or each apparatus, and as a specific example, a first fluid may be a fluid including a solvent remaining after separating a product from a first polymer solution, impurities, and the like, a second fluid may be a fluid including a solvent remaining after separating a product from the second polymer solution, impurities, and the like, and a third fluid may be a fluid including both a fluid discharged from an upper portion of a first column and the second fluid. In addition, a fluid discharged from the upper portion of each column may be a gas or a liquid obtained by condensation of the gas, and a fluid discharged from the lower portion of each column may be liquid.

Figure 1:
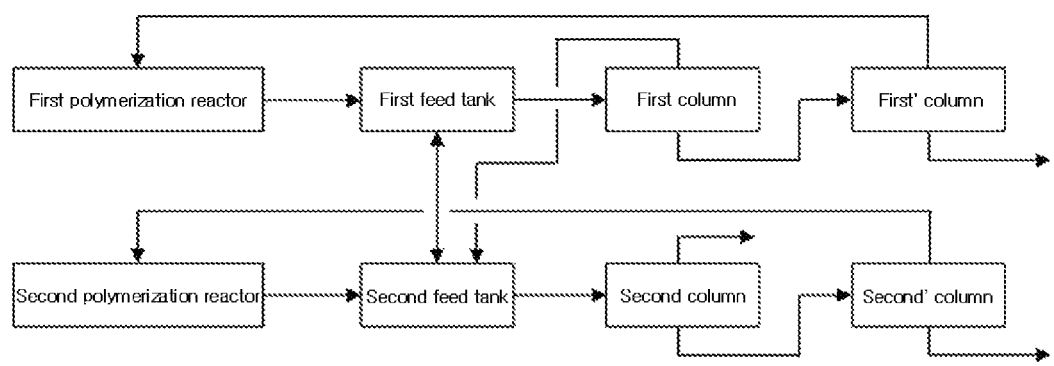
FIG. 1 is a process flow diagram for briefly illustrating a method of preparing a conjugated diene-based polymer according to the present invention.

The method of preparing a conjugated diene-based polymer according to the present invention includes: a step of polymerizing a first conjugated diene-based monomer in solution in a first polymerization reactor to prepare a first polymer solution including a first conjugated diene-based polymer (S10); a step of polymerizing a second conjugated diene-based monomer in solution in a second polymerization reactor to prepare a second polymer solution including a second conjugated diene-based polymer (S20); a step of supplying a first fluid separated from the first polymer solution to a first purification unit and purifying the first fluid (S30); and a step of supplying a second fluid separated from the second polymer solution to a second purification unit and purifying the second fluid (S40), wherein the first purification unit is provided with a first feed tank, a first column connected to the first feed tank, and a first' column connected to the first column, the second purification unit is provided with a second feed tank, a second column connected to the second feed tank, and a second' column connected to the second column, a fluid discharged from an upper portion of the first column is supplied to the second feed tank, and the first feed tank is supplied with a third fluid from the second feed tank (see FIG. 1).

In the method of preparing a conjugated diene-based polymer according to the present invention, the first fluid and the second fluid separated respectively from the first polymer solution and the second polymer solution are supplied to the first purification unit and the second purification unit and purified, while the fluid discharged from the upper portion of the first column of the first purification unit for purifying the first fluid is supplied to the second feed tank of the second purification unit for purifying the second fluid, as described above.

Meanwhile, a fluid deficiency of the first feed tank may be supplemented by being supplied with the third fluid from the second feed tank, and efficiently recovering and reusing a high-purity solvent used in preparation of the first conjugated diene-based polymer from the first fluid. Thus, a side effect in the reaction process due to the reusable solvent obtained by purification of the first fluid is prevented and a loss of the solvent due to the purification process of the solvent is prevented, thereby having an effect of improving productivity of the conjugated diene-based polymer. Unlike the present invention, when the first fluid is purified only using the first column and the first' column in the first purification unit, there is a limitation on removal of impurities in the first fluid, and when the fluid discharged from the upper portion of the first column is not supplied to the second feed tank but simply discharged, a loss of the solvent in the discharged fluid occurs which increases the cost, or an additional column for recovering the solvent in the discharged fluid is needed which increases the investment cost, and variables of process management are increased which increases an operator's fatigue.

According to an exemplary embodiment of the present invention, the first conjugated diene-based polymer may be prepared in the solvent having a purity of 99.5% or more and the second conjugated diene-based polymer may be prepared in the solvent having a purity of 95.0% or more. That is, the first conjugated diene-based polymer may be prepared in the high-purity solvent, and the second conjugated diene-based polymer may be prepared in a relatively low-purity solvent as compared with the first conjugated diene-based polymer. However, this does not mean that the second conjugated diene-based polymer is not prepared in the high-purity solvent having a purity of 99.5% or more. As a specific example, the first conjugated diene-based polymer may be a lanthanide rare earth element compound catalyzed conjugated diene-based polymer or an alkali metal compound catalyzed conjugated diene-based polymer, and the second conjugated diene-based polymer may be a transition metal compound catalyzed conjugated diene-based polymer.

According to an exemplary embodiment of the present invention, the first conjugated diene-based polymer may be polymerized in the presence of a Ziegler-Natta catalyst of the lanthanide rare earth element compound or an anion catalyst of the alkali metal compound and the solvent. The lanthanide rare earth element compound may be a compound including any one or two or more elements among rare earth elements of atomic numbers 57 to 71 in the periodic table, such as neodymium, praseodymium, cerium, lanthanum, gadolinium, or the like, and more specifically a compound including neodymium. In addition, the lanthanide rare earth element compound may be a salt of a lanthanide rare earth element which is soluble in a hydrocarbon solvent such as a carboxylate, alkoxide, a β-diketone complex, phosphate, or phosphite, and more specifically a neodymium-containing carboxylate.

As a specific example, the lanthanide rare earth element compound may be any one or a mixture of two or more selected from the group consisting of Nd(neodecanoate)$_3$, Nd(2-ethylhexanoate)$_3$, Nd(2,2-diethyl decanoate)$_3$, Nd(2,2-dipropyl decanoate)$_3$, Nd(2,2-dibutyl decanoate)$_3$, Nd(2,2-dihexyl decanoate)$_3$, Nd(2,2-dioctyl decanoate)$_3$, Nd(2-ethyl-2-propyl decanoate)$_3$, Nd(2-ethyl-2-butyl decanoate)$_3$, Nd(2-ethyl-2-hexyl decanoate)$_3$, Nd(2-propyl-2-butyl decanoate)$_3$, Nd(2-propyl-2-hexyl decanoate)$_3$, Nd(2-propyl-2-isopropyl decanoate)$_3$, Nd(2-butyl-2-hexyl decanoate)$_3$, Nd(2-hexyl-2-octyl decanoate)$_3$, Nd(2-t-butyl decanoate)$_3$, Nd(2,2-diethyl octanoate)$_3$, Nd(2,2-dipropyl octanoate)$_3$, Nd(2,2-dibutyl octanoate)$_3$, Nd(2,2-dihexyl octanoate)$_3$, Nd(2-ethyl-2-propyl octanoate)$_3$, Nd(2-ethyl-2-hexyl octanoate)$_3$, Nd(2,2-diethyl nonanoate)$_3$, Nd(2,2-dipropyl nonanoate)$_3$, Nd(2,2-dibutyl nonanoate)$_3$, Nd(2,2-dihexylnonanoate)$_3$, Nd(2-ethyl-2-propyl nonanoate)$_3$, and Nd(2-ethyl-2-hexyl nonanoate)$_3$.

As a more specific example, the lanthanide rare earth element compound may be any one or a mixture of two or more selected from the group consisting of Nd(2,2-diethyl decanoate)$_3$, Nd(2,2-dipropyl decanoate)$_3$, Nd(2,2-dibutyl decanoate)$_3$, Nd(2,2-dihexyl decanoate)$_3$, and Nd(2,2-dioctyl decanoate)$_3$.

In addition, according to an exemplary embodiment of the present invention, the lanthanide rare earth element compound may be used in the form of a catalyst composition including a cocatalyst which is usable with the lanthanide rare earth element compound, and the cocatalyst may include an alkylating agent such as an organic metal compound and a halogenating agent such as a halogen compound, which may transfer a hydrocarbyl group to another metal.

In addition, as a specific example, the alkali metal compound may be one or more selected from the group consisting of methyllithium, ethyllithium, propyllithium, n-butyllithium, s-butyllithium, t-butyllithium, hexyllithium, n-decyllithium, t-octyllithium, phenyllithium, 1-naphthyllithium, n-eicosyllithium, 4-butylphenyllithium, 4-tolyllithium, cyclohexyllithium, 3,5-di-n-heptylcyclohexyllithium, 4-cyclopentyllithium, naphthylsodium, naphthyl potassium, lithium alkoxide, sodium alkoxide, potassium alkoxide, lithium sulfonate, sodium sulfonate, potassium sulfonate, lithium amide, sodium amide, potassium amide, and lithium isopropylamide.

Since a catalyst for preparing the first conjugated diene-based polymer is vulnerable to impurities so that for example, the catalyst has reduced activity by the impurities included in the solvent, the catalyst needs to be used in a high-purity solvent environment.

In addition, according to an exemplary embodiment of the present invention, the second conjugated diene-based polymer may be polymerized in the presence of a Ziegler-Natta catalyst of a transition metal compound and a solvent, and as a specific example, the transition metal compound may be a nickel-based Ziegler-Natta catalyst, and as a more specific example, the transition metal compound may be one or more selected from the group consisting of nickel benzoate, nickel acetate, nickel naphthenate, nickel octanoate, nickel neodecanoate, nickel 2-ethylhexanoate, bis(π-allylnickel), bis(n-cycloocta-1,5-diene), bis(n-allyl nickel trifluoroacetate), bis (a-furyldioxime) nickel, nickel palmitate, nickel stearate, nickel acetylacetonate, nickel salicylaldehyde, bis(salicylaldehyde) ethylenediimine nickel, bis(cyclopentadiene) nickel, cyclopentadienyl nickel nitrosyl, and nickel tetracarbonyl. Since according to a degree to which the activity of the catalyst is decreased by impurities included in the solvent, the catalyst for preparing the second conjugated diene-based polymer is less vulnerable to impurities than the catalyst for preparing the first conjugated diene-based polymer, the purity of the solvent may be less restrictive than the high-purity solvent used in the preparation of the first conjugated diene-based polymer.

According to an exemplary embodiment of the present invention, the monomer for preparing the first conjugated diene-based polymer may be a conjugated diene-based monomer, as a specific example, may be one or more selected from the group consisting of 1,3-butadiene, 2,3-dimethyl-1,3-butadiene, 2-ethyl-1,3-butadiene, 1,3-pentadiene, and isoprene, and as a more specific example, may be 1,3-butadiene. In addition, when the first conjugated diene-based polymer is prepared in the presence of the alkali metal compound catalyst, the monomer for preparing the first conjugated diene-based polymer may further include an aromatic vinyl monomer in addition to the conjugated diene-based monomer, and as a specific example, the aromatic vinyl monomer may be one or more selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene, and 1-vinyl-5-hexylnaphthalene.

In addition, according to an exemplary embodiment of the present invention, the monomer for preparing the second conjugated diene-based polymer may be a conjugated diene-based monomer, and as a specific example, may be one or more selected from the group consisting of 1,3-butadiene, 2,3-dimethyl-1,3-butadiene, 2-ethyl-1,3-butadiene, 1,3-pentadiene, and isoprene, and as a more specific example, may be 1,3-butadiene.

According to an exemplary embodiment of the present invention, the solvent used in the preparation of the first conjugated diene-based polymer and the second conjugated diene-based polymer may be a hydrocarbon solvent, and may be one or more selected from the group consisting of n-pentane, n-hexane, n-heptane, isooctane, cyclohexane, toluene, benzene, and xylene. The solvents used in the preparation of the first conjugated diene-based polymer and the second conjugated diene-based polymer may be identical to each other with only a difference in the purity of the solvent, and the first solvent and the second solvent derived therefrom may be also identical to each other as the kind of the solvent, with only a difference in the purity, presence of absence of impurities, and the content from the solvents used in the preparation of the first conjugated diene-based polymer and the second conjugated diene-based polymer.

In addition, according to an exemplary embodiment of the present invention, steps (S10) and (S20) are for preparing the first polymer solution and the second polymer solution including the first conjugated diene-based polymer and the second conjugated diene-based polymer, respectively, and may be carried out at the same time, or step (S20) may be carried after step (S10), or step (S10) may be carried out after step (S20). In addition, since step (S30) and step (S40) correspond to the steps for purifying the first fluid and the second fluid separated respectively from the first polymer solution and the second polymer solution and using the solvent in the fluid by circulation, steps (S30) and (S40) may be carried out separately from step (S10) and step (S20).

In addition, according to an exemplary embodiment of the present invention, steps (S30) and (S40) are for purifying the first fluid and the second fluid separated respectively from the first polymer solution and the second polymer solution, and may be carried out at the same time, step (S40) may be carried out after step (S30), or step (S30) may be carried out after step (S40).

In addition, the method of preparing a conjugated diene-based polymer according to the present invention may include a first fluid separation process and a second fluid separation process between the first polymerization reactor and the first feed tank, and between the second polymerization reactor and the second feed tank, respectively in FIG. 1, though the separation process of the solvent is not shown in FIG. 1 for convenience of description. That is, according to an exemplary embodiment of the present invention, the method of preparing a conjugated diene-based polymer may include a step of separating the first fluid from the first polymer solution (S11) and a step of separating the second fluid from the second polymer solution (S21), for separating the first fluid and the second fluid from the first polymer solution and the second polymer solution prepared in the above step (S10) and step (S20), respectively.

According to an exemplary embodiment of the present invention, the fluid discharged from the upper portion of the first column may include C4 compounds and a solvent, and the solvent may be included at 10 wt % or more, 10 wt % to 80 wt %, 20 wt % to 80 wt %, or 30 wt % to 80 wt %, based on the total content of the fluid. In this case, the fluid containing impurities is discharged from the upper portion of the first column, thereby having an effect of extremely decreasing the contents of C4s and moisture included in the solvent recovered from the lower portion of the first column.

According to an exemplary embodiment of the present invention, the C4 compounds included in the fluid discharged from the upper portion of the first column may be unreacted monomers such as conjugated diene-based monomers or butenes, and may be supplied to the second feed tank and further purified in the second purification unit.

In addition, according to an exemplary embodiment of the present invention, the fluid discharged from the lower portion of the first column may be supplied to the first' column corresponding to the second column, and here, the fluid discharged from the lower portion of the first column may include C4 compounds at less than 0.5 wt %, less than 0.27 wt %, 0.21 wt % or less, 0.16 wt % or less, 0.14 wt % or less, or 0.11 wt % or less. Within this range, the solvent purified from the first' column is maintained at high purity, thereby having an effect of reusing the solvent as a high-purity solvent, when polymerization is carried out in the first polymerization reactor.

In addition, according to an exemplary embodiment of the present invention, the fluid discharged from the lower portion of the first column may be supplied to the first' column corresponding to the second column, and here, the fluid discharged from the lower portion of the first column may include the solvent at 99.5 wt % or more, 99.76 wt % or more, 99.8 wt % or more, or 99.9 wt % or more. Within this range, the solvent purified from the first' column is maintained at high purity, thereby having an effect of reusing the solvent as a high-purity solvent, when polymerization is carried out in the first polymerization reactor.

In addition, according to an exemplary embodiment of the present invention, the fluid discharged from the lower portion of the first column may be supplied to the first' column corresponding to the second column, and here, the fluid discharged from the lower portion of the first column may include moisture at less than 40 ppm, 30 ppm or less, 25 ppm or less, or 15 ppm or less. Within this range, the solvent purified from the first' column is maintained at high purity, thereby having an effect of reusing the solvent as a high-purity solvent, when polymerization is carried out in the first polymerization reactor. The moisture may be a component derived from a separation process for separating the polymer and the fluid in the polymer solution.

In addition, in the present invention, for convenience of description, the types of each column included in the first purification unit and the second purification unit are described as the first column, the first' column, the second column, and the second' column; however, if necessary, the first purification unit may include the first column and the first' column to the first-n column, and the second purification unit may include the second column, and the second' column to the second-m column, wherein n and m may be an integer selected from 3 to 100.

In addition, according to an exemplary embodiment of the present invention, the method of preparing a conjugated diene-based polymer may include a step of supplying the fluid discharged from the lower portion of the first column to the first' column (S50); a step of supplying the fluid discharged from the lower portion of the second column to the second' column (S60); a step of supplying the solvent purified from the first' column to the first polymerization reactor (S70); and a step of supplying the solvent purified from the second' column to the second polymerization reactor (S80), and in this case, the solvent purified in each of the purification units may be reused at the time of the polymerization reaction in each of the polymerization reactors, thereby having an effect of improving productivity.

In this regard, as described above, the fluid discharged from the upper portion of the first column and supplied to the second feed tank may include the solvent derived from the first fluid. Therefore, when the third fluid is not supplied from the second feed tank to the first feed tank, the first feed tank of the first purification unit is supplied with only the first fluid separated from the first polymer solution prepared in the first polymerization reactor, and thus, the amount of the fluid in the first feed tank may be consistently decreased. In addition, since the second feed tank of the second purification unit is supplied with the fluid component such as the solvent derived from the first fluid by the fluid discharged from the upper portion of the first column, in addition to the second fluid separated from the second polymer solution prepared in the second polymerization reactor, the amount of the fluid in the second feed tank may be consistently increased. However, as in the present invention, when the first feed tank is supplied with the third fluid from the second feed tank, that is, there is a flow of the third fluid from the second feed tank to the first feed tank, it is easy to perform control between the fluid deficiency of the first feed tank and the fluid excess of the second feed tank, thereby having an effect of allowing consistent purification of the first fluid and the second fluid and circulated use of the solvent in each fluid.

In addition, the present invention provides an apparatus for preparing a conjugated diene-based polymer for carrying out the method of preparing a conjugated diene-based polymer. The apparatus for preparing a conjugated diene-based polymer may include an apparatus for preparing a first conjugated diene-based polymer including a first polymerization reactor for polymerizing a first conjugated diene-based polymer in solution and a first purification unit for purifying a first fluid separated from a first polymer solution prepared in the first polymerization reactor; and an apparatus for preparing a second conjugated diene-based polymer including a second polymerization reactor for polymerizing a second conjugated diene-based polymer in solution and a second purification unit for purifying a second fluid separated from a second polymer solution prepared in the second polymerization reactor. The first purification unit may include a first feed tank 100, a first column 110 connected to the first feed tank 100, and a first' column 120 connected to the first column 110, and the second purification unit may include a second feed tank 200, a second column 210 connected to the second feed tank 200, and a second' column 220 connected to the second column 210. A tower top 111 of the first column is connected to the second feed tank 200 by a connecting pipe for supplying a fluid discharged from the upper portion of the first column to the second feed tank 200, and the second feed tank 200 may be connected to the first feed tank by a connecting pipe for supplying a third fluid to the first feed tank 100.

According to an exemplary embodiment of the present invention, the first column 110 and the second column 210 may be provided with condensers 130 and 230 in the upper portion of the tower, respectively. Each of the condensers 130 and 230 may be for adjusting the flow rate and the composition of the fluid discharged from the upper portion of each tower.

According to an exemplary embodiment of the present invention, the first column 110 and the second column 210 may be provided with reboilers 140 and 240 in the lower portion of the tower, respectively. Each of the reboilers 140 and 240 may be for adjusting the flow rate and the composition of the fluid discharged from tower bottoms 112 and 212 of the first column and the second column.

In addition, according to an exemplary embodiment of the present invention, the apparatus for a conjugated diene-based polymer may further include a first separation tower and a second separation tower for separating the first polymer solution and the second polymer solution discharged from the first polymerization reactor and the second polymerization reactor into the first conjugated diene-based polymer and the first fluid, and the second conjugated diene-based polymer and the second fluid, respectively, and in this case, the first polymer solution discharged from the first polymerization reactor may be supplied to the first separation tower, the first fluid separated from the first separation tower may be supplied to the first purification unit, the second polymer solution discharged from the second polymerization reactor may be supplied to the second separation tower, and the second fluid separated from the second separation tower may be supplied to the second purification unit. The separation tower may be for separating a fluid including a polymer, a solvent, impurities, and the like from the polymer solution, and as a specific example, may be a stripper or a devolatilizer. In addition, the separation tower may further include a decanter.

Hereinafter, the present invention will be described in more detail by the Examples. However, the following Examples are provided for illustrating the present invention. It is apparent to a person skilled in the art that various modifications and alterations may be made without departing from the scope and spirit of the present invention, and the scope of the present invention is not limited thereto.

Example 1

Example 1-1

Figure 2:
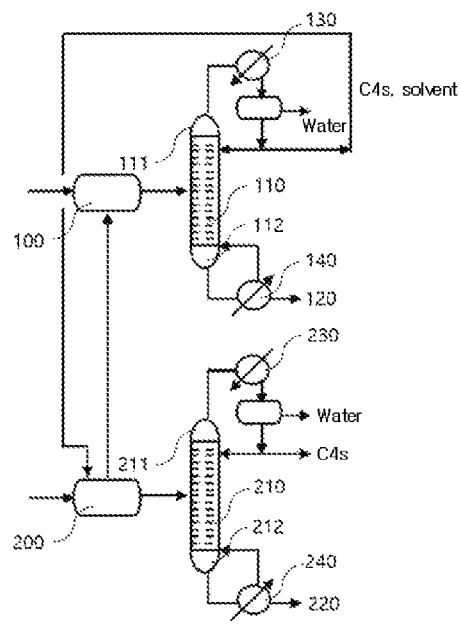
FIG. 2 is a process flow diagram of a method of preparing a conjugated diene-based polymer according to the Example in the present application.

A conjugated diene-based polymer was prepared using the apparatus for preparing a conjugated diene-based polymer as shown in FIG. 2.

A conjugated diene-based polymer was polymerized in anion solution using n-butyllithium, a styrene monomer, and a 1,3-butadiene monomer, a polymer solution including impurities such as an unreacted 1,3-butadiene monomer, an unreacted styrene monomer, a dimer, butenes, and hexane as a solvent was passed through a stripper and a decanter to recover a first fluid including the solvent and the impurities, and the first fluid was supplied to a first feed tank 100 at a flow rate of 41.4 T/h. An upper condenser 130 of a first column 110 was adjusted to be at a temperature of 49° C. and a pressure of 4.0 barg, and a reboiler 140 was adjusted to be at temperature of 129° C. and a pressure of 4.3 barg. From a tower top 111 of the first column, a fluid including the unreacted monomer and C4s was recovered, which was supplied to the second feed tank 200, and the content of hexane as a solvent in the fluid was adjusted to 10 wt %, which was supplied to the second feed tank 200 with the fluid.

Simultaneously, a conjugated diene-based polymer was polymerized in solution using a nickel catalyst and a 1,3-butadiene monomer, then a polymer solution including impurities such as an unreacted 1,3-butadiene monomer, a dimer, butenes, and hexane as a solvent was passed through the stripper and the decanter to recover a second fluid including the solvent and the impurities, and the second fluid was supplied to a second feed tank 200 at a flow rate of 27.6 T/h. An upper condenser 230 of a second column 210 was adjusted to be at a temperature of 47° C. and a pressure of 4.0 barg, and a reboiler 240 was adjusted to be at temperature of 125° C. and a pressure of 4.3 barg. From the tower top 211 of the second column, a fluid including an unreacted monomer and C4s was recovered at an average flow rate of 0.57 T/h, and the content of hexane as a solvent in the fluid recovered from the tower top 211 of the second column was controlled to 1 wt % or less. In order to adjust the insufficient amount of the fluid in the first feed tank due to the flow of the fluid, a third fluid in the second feed tank was supplied to the first feed tank at 0.03 T/h.

Here, an average flow rate of the tower top 111 of the first column 110 was 0.27 T/h, butenes in the stream of the tower bottom 112 was 0.11 wt %, and the moisture content was 25 ppm.

Example 1-2

The same process as in Example 1-1 was carried out, except that in Example 1-1, the temperature of the upper condenser 130 of the first column 110 was adjusted to 53° C., the temperature of the reboiler 140 was adjusted to 131° C., the content of hexane as a solvent in the fluid supplied from the tower top 111 to the second feed tank 200 was adjusted to 20 wt %, and in order to adjust the insufficient amount of the fluid in the first feed tank due to the flow of the fluid, the third fluid was supplied from the second feed tank to the first feed tank at 0.06 T/h.

Here, an average flow rate of the tower top 111 of the first column 110 was 0.30 T/h, butenes in the stream of the tower bottom 112 was 0.09 wt %, and the moisture content was 15 ppm.

Example 1-3

The same process as in Example 1-1 was carried out, except that in Example 1-1, the temperature of the upper condenser 130 of the first column 110 was adjusted to 55° C., the temperature of the reboiler 140 was adjusted to 134° C., the content of hexane as a solvent in the fluid supplied from the tower top 111 to the second feed tank 200 was adjusted to 30 wt %, and in order to adjust the insufficient amount of the fluid in the first feed tank due to the flow of the fluid, the third fluid was supplied from the second feed tank to the first feed tank at 0.11 T/h.

Here, an average flow rate of the tower top 111 of the first column 110 was 0.35 T/h, butenes in the stream of the tower bottom 112 was 0.01 wt % or less, and the moisture content was 1 ppm or less.

Example 1-4

The same process as in Example 1-1 was carried out, except that in Example 1-1, the temperature of the upper condenser 130 of the first column 110 was adjusted to 63° C., the temperature of the reboiler 140 was adjusted to 134° C., the content of hexane as a solvent in the fluid supplied from the tower top 111 to the second feed tank 200 was adjusted to 50 wt %, and in order to adjust the insufficient amount of the fluid in the first feed tank due to the flow of the fluid, the third fluid was supplied from the second feed tank to the first feed tank at 0.26 T/h.

Here, an average flow rate of the tower top 111 of the first column 110 was 0.50 T/h, butenes in the stream of the tower bottom 112 was 0.01 wt % or less, and the moisture content was 1 ppm or less.

Example 1-5

The same process as in Example 1-1 was carried out, except that in Example 1-1, the temperature of the upper condenser 130 of the first column 110 was adjusted to 84° C., the temperature of the reboiler 140 was adjusted to 131° C., the content of hexane as a solvent in the fluid supplied from the tower top 111 to the second feed tank 200 was adjusted to 80 wt %, and in order to adjust the insufficient amount of the fluid in the first feed tank due to the flow of the fluid, the third fluid was supplied from the second feed tank to the first feed tank at 1.12 T/h.

Here, an average flow rate of the tower top 111 of the first column 110 was 1.36 T/h, butenes in the stream of the tower bottom 112 was 0.01 wt % or less, and the moisture content was 1 ppm or less.

Comparative Example 1-1

Figure 3:
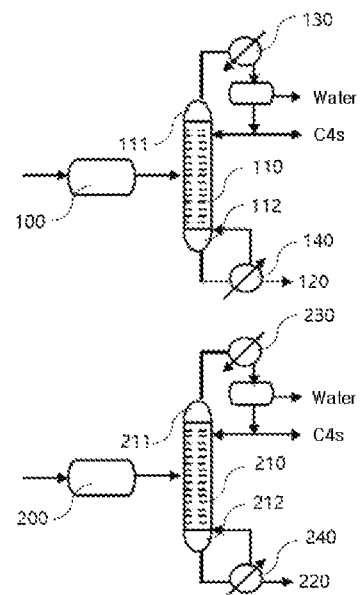
FIG. 3 is a process flow diagram of a method of preparing a conjugated diene-based polymer according to the Comparative Example in the present application.

A conjugated diene-based polymer was prepared using the apparatus for preparing a conjugated diene-based polymer as shown in FIG. 3.

A conjugated diene-based polymer was polymerized in anion solution using a styrene monomer, and a 1,3-butadiene monomer, then a polymer solution including impurities such as an unreacted 1,3-butadiene monomer, an unreacted styrene monomer, a dimer, butenes, and hexane as a solvent was passed through the stripper and the decanter to recover the first fluid including the solvent and the impurities, and the first fluid was supplied to the first feed tank 100 at a flow rate of 41.4 T/h. The upper condenser 130 of the first column 110 was adjusted to be at a temperature of 46° C. and a pressure of 4.0 barg, and the reboiler 140 was adjusted to be at temperature of 127° C. and a pressure of 4.3 barg. From the tower top 111, a fluid including an unreacted monomer and C4s was recovered at an average flow rate of 0.24 T/h, and the content of hexane as a solvent in the fluid recovered from the tower top 111 was controlled to 1 wt % or less.

Simultaneously, a conjugated diene-based polymer was polymerized in solution using a nickel catalyst and a 1,3-butadiene monomer, then a polymer solution including impurities such as an unreacted 1,3-butadiene monomer, a dimer, butenes, and hexane as a solvent was passed through the stripper and the decanter to recover a second fluid including the solvent and the impurities, and the second fluid was supplied to a second feed tank 200 at a flow rate of 27.6 T/h. An upper condenser 230 of a second column 210 was adjusted to be at a temperature of 47° C. and a pressure of 4.0 barg, and a reboiler 240 was adjusted to be at temperature of 125° C. and a pressure of 4.3 barg. From the tower top 211, a fluid including an unreacted monomer and C4s was recovered at an average flow rate of 0.33 T/h, and the content of hexane as a solvent in the fluid recovered from the tower top 211 was controlled to 1 wt % or less.

Comparative Example 1-2

The same process was carried out as in Comparative Example 1-1, except that in Comparative Example 1-1, the temperature of the upper condenser 130 of the first column 110 was adjusted to 49° C., the temperature of the reboiler 140 was adjusted to 129° C., and the content of hexane as a solvent in the fluid recovered from the tower top 111 was increased to 10 wt %.

Here, an average flow rate of the tower top 111 of the first column 110 was 0.27 T/h, butenes in the stream of the tower bottom 112 was 0.11 wt %, and the moisture content was 25 ppm; however, a loss of hexane as a solvent of 0.03 T/h occurred.

Comparative Example 1-3

The same process was carried out as in Comparative Example 1-1, except that in Comparative Example 1-1, the temperature of the upper condenser 130 of the first column 110 was adjusted to 53° C., the temperature of the reboiler 140 was adjusted to 131° C., and the content of hexane as a solvent in the fluid recovered from the tower top 111 was increased to 20 wt %.

Here, an average flow rate of the tower top 111 of the first column 110 was 0.30 T/h, butenes in the stream of the tower bottom 112 was 0.09 wt %, and the moisture content was 15 ppm; however, a loss of hexane as a solvent of 0.06 T/h occurred.

Experimental Example 1

In Examples 1-1 to 1-5, and Comparative Examples 1-1 to 1-3, the amount of energy used in the reboiler for carrying out purification of the first column and the second column, the temperature of the tower top and the tower bottom of the first column, the temperature of the tower top and the tower bottom of the second column, a ratio of hexane in the fluid discharged from the tower top of the first column, the composition of the tower bottom stream of the first column, and the composition of the tower bottom stream of the second column are shown in the following Table 1:

TABLE 1

| Classification | | | | Example | | | | | Comparative Example | | |
|---|---|---|---|---|---|---|---|---|---|---|---|
| | | | 1-1 | 1-2 | 1-3 | 1-4 | 1-5 | 1-1 | 1-2 | 1-3 |
| First column reboiler energy | | Gcal/h | 1.73 | 1.81 | 1.90 | 1.91 | 1.96 | 1.65 | 1.73 | 1.81 |
| Second column reboiler energy | | | 1.15 | 1.15 | 1.15 | 1.15 | 1.15 | 1.04 | 1.04 | 1.04 |
| Total reboiler energy | | | 2.88 | 2.96 | 3.05 | 3.06 | 3.11 | 2.69 | 2.77 | 2.85 |
| First column tower top flow rate | | T/h | 0.27 | 0.30 | 0.35 | 0.50 | 1.36 | 0.24 | 0.27 | 0.30 |
| Second column tower top flow rate | | | 0.57 | 0.57 | 0.57 | 0.57 | 0.57 | 0.33 | 0.33 | 0.33 |
| Third fluid flow rate | | | 0.03 | 0.06 | 0.11 | 0.26 | 1.12 | — | — | — |
| First column | Tower top temperature | ° C. | 49 | 53 | 55 | 63 | 84 | 46 | 49 | 53 |
| | Tower bottom temperature | | 129 | 131 | 134 | 134 | 134 | 127 | 129 | 131 |
| Second column | Tower top temperature | | 47 | 47 | 47 | 47 | 47 | 47 | 47 | 47 |
| | Tower bottom temperature | | 125 | 125 | 125 | 125 | 125 | 125 | 125 | 125 |
| Ratio of hexane in fluid discharged from the first column | | wt % | 10 | 20 | 30 | 50 | 80 | <1 | 10 | 20 |
| Ratio of hexane in fluid discharged from the second column | | | <1 | <1 | <1 | <1 | <1 | <1 | <1 | <1 |
| Composition of first column tower bottom stream | 1,3-butadiene | wt % | 0.03 | 0.02 | <0.01 | <0.01 | <0.01 | 0.04 | 0.03 | 0.02 |
| | Butenes | | 0.11 | 0.09 | <0.01 | <0.01 | <0.01 | 0.14 | 0.11 | 0.09 |
| | Water | | 25 ppm | 15 ppm | <1 ppm | <1 ppm | <1 ppm | 40 ppm | 25 ppm | 15 ppm |
| | n-hexane | | 99.80 | 99.83 | 99.94 | 99.94 | 99.94 | 99.76 | 99.80 | 99.83 |
| | Heavies | | 0.06 | 0.06 | 0.06 | 0.06 | 0.06 | 0.06 | 0.06 | 0.06 |
| | Total | | 100 | 100 | 100 | 100 | 100 | 100 | 100 | 100 |
| Composition of second column tower bottom stream | 1,3-butadiene | wt % | 0.14 | 0.14 | 0.14 | 0.14 | 0.14 | 0.28 | 0.14 | 0.28 |
| | Butenes | | 0.52 | 0.52 | 0.52 | 0.52 | 0.52 | 0.61 | 0.52 | 0.61 |
| | Water | | 45 ppm | 45 ppm | 45 ppm | 45 ppm | 45 ppm | 45 ppm | 45 ppm | 45 ppm |
| | n-hexane | | 99.33 | 99.33 | 99.33 | 99.33 | 99.33 | 99.10 | 99.33 | 99.10 |
| | Heavies | | 0.01 | 0.01 | 0.011 | 0.011 | 0.011 | 0.01 | 0.01 | 0.01 |
| | Total | | 100 | 100 | 100 | 100 | 100 | 100 | 100 | 100 |

As shown in the above Table 1, it was confirmed that in Examples 1-1 to 1-5 in which the polymer is prepared by the method of preparing a conjugated diene-based polymer according to the present invention and the fluid recovered therefrom is purified, the contents of butenes and moisture in the tower bottom stream of the first column are extremely decreased, thereby recovering the solvent having a minimized content of impurities, as compared with Comparative Example 1-1 in which the fluid discharged from the upper portion of the first column is supplied to the second feed tank, and the third fluid is supplied from the second feed tank to the first feed tank, thereby simply removing butenes and moisture from the tower top of the first column. In addition, it was confirmed that as the content of hexane in the fluid discharged from the tower top of the first column is increased, the effect of the present invention is better.

In addition, even in the case that the fluid discharged from the upper portion of the first column is not supplied to the second feed tank, in Comparative Examples 1-2 and 1-3 in which the content of hexane in the fluid discharged from the tower top of the first column is increased, the contents of butenes and moisture in the tower bottom stream of the first column were decreased in the same level as Examples 1-1 and 1-2, respectively; however, unlike Examples 1-1 and 1-2 in which there was no loss of hexane as the solvent, it was confirmed that a loss of hexane as the solvent occurred at 0.03 T/h in Comparative Example 1-2 and at 0.06 T/h in Comparative Example 1-3. When the cost of hexane is 800,000 KRW per T, an increase in cost of total 192,000,000 KRW per year (=0.03 T/h*800,000 KRW/T 8,000 h/year) in Comparative Example 1-2, and an increase in cost of total 384,000,000 KRW per year (=0.06 T/h*800,000 KRW/T*8,000 h/year) in Comparative Example 1-3 result, and when the cost of reboiler energy is 100,000 KRW per Gcal, about 2 times to 4.5 times cost increases occur, as compared with the increase in energy cost occurring when the used amount of reboiler energy is increased according to the present invention, which is 88,000,000 KRW/year (=0.11 Gcal/h (=total reboiler energy of Example 1-1 or 1-2–total reboiler energy of Comparative Example 1-2 or 1-3) 100,000 KRW/Gcal 8,000 h/year), thereby decreasing productivity and economic efficiency.

Example 2

Example 2-1

A conjugated diene-based polymer was prepared using the apparatus for preparing a conjugated diene-based polymer as shown in FIG. 2.

A conjugated diene-based polymer was polymerized in solution using a neodymium catalyst and a 1,3-butadiene monomer, then a polymer solution including impurities such as an unreacted 1,3-butadiene monomer, a dimer, butenes, and hexane as a solvent was passed through the stripper and the decanter to recover a first fluid including the solvent and the impurities, and the first fluid was supplied to a first feed tank 100 at a flow rate of 31.3 T/h. The upper condenser 130 of the first column 110 was adjusted to be at a temperature of 49° C. and a pressure of 4.0 barg, and the reboiler 140 was adjusted to be at temperature of 129° C. and a pressure of 4.3 barg. From the tower top 111, a fluid including the unreacted monomer and C4s was recovered, which was supplied to the second feed tank 200, and the content of hexane as a solvent in the fluid was adjusted to 10 wt %, which was supplied to the second feed tank 200 with the fluid.

Simultaneously, a conjugated diene-based polymer was polymerized in solution using a nickel catalyst and a 1,3-butadiene monomer, then a polymer solution including impurities such as an unreacted 1,3-butadiene monomer, a dimer, butenes, and hexane as a solvent was passed through the stripper and the decanter to recover a second fluid including the solvent and the impurities, and the second fluid was supplied to a second feed tank 200 at a flow rate of 27.6 T/h. An upper condenser 230 of a second column 210 was adjusted to be at a temperature of 47° C. and a pressure of 4.0 barg, and a reboiler 240 was adjusted to be at temperature of 125° C. and a pressure of 4.3 barg. From the tower top 211, a fluid including an unreacted monomer and C4s was recovered at an average flow rate of 0.58 T/h, and the content of hexane as a solvent in the fluid recovered from the tower top 211 was controlled to 1 wt % or less. In order to adjust the insufficient amount of the fluid in the first feed tank due to the flow of the fluid, a third fluid in the second feed tank was supplied to the first feed tank at 0.03 T/h.

Here, an average flow rate of the tower top 111 of the first column 110 was 0.28 T/h, butenes in the stream of the tower bottom 112 was 0.16 wt %, and the moisture content was 20 ppm.

Example 2-2

The same process as in Example 2-1 was carried out, except that in Example 2-1, the temperature of the upper condenser 130 of the first column 110 was adjusted to 53° C., the temperature of the reboiler 140 was adjusted to 132° C., the content of hexane as a solvent in the fluid supplied from the tower top 111 to the second feed tank 200 was adjusted to 20 wt %, and in order to adjust the insufficient amount of the fluid in the first feed tank due to the flow of the fluid, the third fluid was supplied from the second feed tank to the first feed tank at 0.07 T/h.

Here, an average flow rate of the tower top 111 of the first column 110 was 0.32 T/h, butenes in the stream of the tower bottom 112 was 0.13 wt %, and the moisture content was 5 ppm.

Example 2-3

The same process as in Example 2-1 was carried out, except that in Example 2-1, the temperature of the upper condenser 130 of the first column 110 was adjusted to 55° C., the temperature of the reboiler 140 was adjusted to 134° C., the content of hexane as a solvent in the fluid supplied from the tower top 111 to the second feed tank 200 was adjusted to 30 wt %, and in order to adjust the insufficient amount of the fluid in the first feed tank due to the flow of the fluid, the third fluid was supplied from the second feed tank to the first feed tank at 0.11 T/h.

Here, an average flow rate of the tower top 111 of the first column 110 was 0.36 T/h, butenes in the stream of the tower bottom 112 was 0.01 wt % or less, and the moisture content was 1 ppm or less.

Comparative Example 2-1

A conjugated diene-based polymer was prepared using the apparatus for preparing a conjugated diene-based polymer as shown in FIG. 3.

A conjugated diene-based polymer was polymerized in solution using a neodymium catalyst and a 1,3-butadiene monomer, then a polymer solution including impurities such as an unreacted 1,3-butadiene monomer, a dimer, butenes, and hexane as a solvent was passed through the stripper and the decanter to recover a first fluid including the solvent and the impurities, and the first fluid was supplied to a first feed tank 100 at a flow rate of 31.3 T/h. The upper condenser 130 of the first column 110 was adjusted to be at a temperature of 46° C. and a pressure of 4.0 barg, and the reboiler 140 was adjusted to be at temperature of 127° C. and a pressure of 4.3 barg. From the tower top 111, a fluid including an unreacted monomer and C4s was recovered at an average flow rate of 0.25 T/h, and the content of hexane as a solvent in the fluid recovered from the tower top 111 was controlled to 1 wt % or less.

Simultaneously, a conjugated diene-based polymer was polymerized in solution using a nickel catalyst and a 1,3-butadiene monomer, then a polymer solution including impurities such as an unreacted 1,3-butadiene monomer, a dimer, butenes, and hexane as a solvent was passed through the stripper and the decanter to recover a second fluid including the solvent and the impurities, and the second fluid was supplied to a second feed tank 200 at a flow rate of 27.6 T/h. An upper condenser 230 of a second column 210 was adjusted to be at a temperature of 47° C. and a pressure of 4.0 barg, and a reboiler 240 was adjusted to be at temperature of 125° C. and a pressure of 4.3 barg. From the tower top 211, a fluid including an unreacted monomer and C4s was recovered at an average flow rate of 0.33 T/h, and the content of hexane as a solvent in the fluid recovered from the tower top 211 was controlled to 1 wt % or less.

Experimental Example 2

In Examples 2-1 to 2-3, and Comparative Example 2-1, the amount of energy used in the reboiler for carrying out purification of the first column and the second column, the temperature of the tower top and the tower bottom of the first column, the temperature of the tower top and the tower bottom of the second column, a ratio of hexane in the fluid discharged from the tower top of the first column, the composition of the tower bottom stream of the first column, and the composition of the tower bottom stream of the second column are shown in the following Table 2:

TABLE 2

| Classification | | | Example | | | Comparative Example |
|---|---|---|---|---|---|---|
| | | | 2-1 | 2-2 | 2-3 | 2-1 |
| First column reboiler energy | | Gcal/h | 1.31 | 1.39 | 1.43 | 1.24 |
| Second column reboiler energy | | | 1.15 | 1.15 | 1.15 | 1.04 |
| Total reboiler energy | | | 2.46 | 2.54 | 2.58 | 2.28 |
| First column tower top flow rate | | T/h | 0.28 | 0.32 | 0.36 | 0.25 |
| Second column tower top flow rate | | | 0.58 | 0.58 | 0.58 | 0.33 |
| Third fluid flow rate | | | 0.03 | 0.07 | 0.11 | — |
| First column | Tower top temperature | ° C. | 49 | 53 | 55 | 46 |
| | Tower bottom temperature | | 129 | 132 | 134 | 127 |

TABLE 2-continued

| Classification | | | Example | | | Comparative Example |
|---|---|---|---|---|---|---|
| | | | 2-1 | 2-2 | 2-3 | 2-1 |
| Second column | Tower top temperature | | 47 | 47 | 47 | 47 |
| | Tower bottom temperature | | 125 | 125 | 125 | 125 |
| Ratio of hexane in fluid discharged from the first column | | wt % | 10 | 20 | 30 | <1 |
| Ratio of hexane in fluid discharged from the second column | | | <1 | <1 | <1 | <1 |
| Composition of first column tower bottom stream | 1,3-butadiene | wt % | 0.05 | 0.03 | <0.01 | 0.08 |
| | Butenes | | 0.16 | 0.13 | <0.01 | 0.19 |
| | Water | | 20 ppm | 5 ppm | <1 ppm | 40 ppm |
| | n-hexane | | 99.78 | 99.83 | 99.99 | 99.72 |
| | Heavies | | 0.01 | 0.01 | 0.01 | 0.01 |
| | Total | | 100 | 100 | 100 | 100 |
| Composition of second column tower bottom stream | 1,3-butadiene | wt % | 0.14 | 0.14 | 0.14 | 0.28 |
| | Butenes | | 0.52 | 0.52 | 0.52 | 0.61 |
| | Water | | 45 ppm | 45 ppm | 45 ppm | 45 ppm |
| | n-hexane | | 99.33 | 99.33 | 99.33 | 99.10 |
| | Heavies | | 0.01 | 0.01 | 0.011 | 0.01 |
| | Total | | 100 | 100 | 100 | 100 |

As shown in the above Table 2, it was confirmed that though the catalyst was different from that of Example 1, in Examples 2-1 to 2-3 in which the polymer is prepared by the method of preparing a conjugated diene-based polymer according to the present invention and the fluid recovered therefrom is purified, the contents of butenes and moisture in the tower bottom stream of the first column are extremely decreased, thereby recovering the solvent having a minimized content of impurities, as compared with Comparative Example 2-1 in which the fluid discharged from the upper portion of the first column is supplied to the second feed tank, and the third fluid is supplied from the second feed tank to the first feed tank, thereby simply removing butenes and moisture from the tower top of the first column. In addition, it was confirmed that as the content of hexane in the fluid discharged from the tower top of the first column is increased, the effect of the present invention is better.

From the above results, the inventors of the present invention were able to confirm that use of the method of preparing a conjugated diene-based polymer and the apparatus for preparing the same according to the present invention allows, when preparing the conjugated diene-based polymer using solution polymerization, utilization of the conventional apparatus for preparation, while recovering and reusing a high-purity solvent, thereby having an effect of preventing a side effect in a reaction process due to the reusable solvent and preventing a loss of the solvent due to the purification process of the solvent to improve productivity of the conjugated diene-based polymer.

The invention claimed is:
1. A method of preparing a conjugated diene-based polymer, comprising:
polymerizing a first conjugated diene-based monomer in solution in a first polymerization reactor to prepare a first polymer solution including a first conjugated diene-based polymer (S10);

polymerizing a second conjugated diene-based monomer in solution in a second polymerization reactor to prepare a second polymer solution including a second conjugated diene-based polymer (S20);

supplying a first fluid separated from the first polymer solution to a first purification unit and purifying the first fluid (S30); and supplying a second fluid separated from the second polymer solution to a second purification unit and purifying the second fluid (S40), wherein the first purification unit comprises a first feed tank, a first column connected to the first feed tank, and a first' column connected to the first column, the second purification unit comprises a second feed tank, a second column connected to the second feed tank, and a second' column connected to the second column, a fluid discharged from an upper portion of the first column is supplied to the second feed tank, and the first feed tank is supplied with a third fluid from the second feed tank.

2. The method of preparing a conjugated diene-based polymer of claim 1, wherein the first conjugated diene-based polymer is prepared in a solvent having a purity of 99.5% or more, and the second conjugated diene-based polymer is prepared in a solvent having a purity of 95.0% or more.

3. The method of preparing a conjugated diene-based polymer of claim 1, wherein the first conjugated diene-based polymer is a lanthanide rare earth element compound catalyzed conjugated diene-based polymer or an alkali metal compound catalyzed conjugated diene-based polymer, and the second conjugated diene-based polymer is a transition metal compound catalyzed conjugated diene-based polymer.

4. The method of preparing a conjugated diene-based polymer of claim 1, wherein the fluid discharged from the upper portion of the first column includes C4 compounds and a solvent, and the solvent is included at 10 wt % or more based on a total content of the fluid.

5. The method of preparing a conjugated diene-based polymer of claim 1, wherein a fluid discharged from a lower portion of the first column is supplied to the first' column, and the fluid discharged from the lower portion of the first column includes less than 0.5 wt % of C4 compounds.

6. The method of preparing a conjugated diene-based polymer of claim 1, wherein a fluid discharged from a lower portion of the first column is supplied to the first' column, and the fluid discharged from the lower portion of the first column includes 0.21 wt % or less of C4 compounds.

7. The method of preparing a conjugated diene-based polymer of claim 1, wherein a fluid discharged from the lower portion of the first column is supplied to the first' column, and the fluid discharged from the lower portion of the first column includes less than 40 ppm of moisture.

8. The method of preparing a conjugated diene-based polymer of claim 7, wherein the fluid discharged from the lower portion of the first column is supplied to the first' column, and the fluid discharged from the lower portion of the first column includes 25 ppm or less of moisture.

9. The method of preparing a conjugated diene-based polymer of claim 1, comprising:

supplying a fluid discharged from the lower portion of the first column to the first' column (S50); supplying a fluid discharged from a lower portion of the second column to the second' column (S60); supplying a solvent purified from the first' column to the first polymerization reactor (S70); and supplying a solvent purified from the second' column to the second polymerization reactor (S80).

10. An apparatus for preparing a conjugated diene-based polymer, comprising:

an apparatus for preparing a first conjugated diene-based polymer comprising a first polymerization reactor for polymerizing a first conjugated diene-based polymer in solution and a first purification unit for purifying a first fluid separated from a first polymer solution prepared in the first polymerization reactor; and an apparatus for preparing a second conjugated diene-based polymer comprising a second polymerization reactor for polymerizing a second conjugated diene-based polymer in solution and a second purification unit for purifying a second fluid separated from a second polymer solution prepared in the second polymerization reactor, wherein the first purification unit comprises a first feed tank, a first column connected to the first feed tank, and a first' column connected to the first column, the second purification unit comprises a second feed tank, a second column connected to the second feed tank, and a second' column connected to the second column, an upper portion of the first column is connected to the second feed tank by a connecting pipe for supplying a fluid discharged from the upper portion of the first column to the second feed tank, and the second feed tank is connected to the first feed tank by a connecting pipe for supplying a third fluid to the first feed tank.

11. The apparatus for preparing a conjugated diene-based polymer of claim 10, wherein the first column and the second column comprise a condenser in an upper portion of a tower, respectively.

12. The apparatus for preparing a conjugated diene-based polymer of claim 10, wherein the first column and the second column comprise a reboiler in a lower portion of a tower, respectively.

13. The method of preparing a conjugated diene-based polymer of claim 1, wherein the fluid discharged from the upper portion of the first column includes C4 compounds and a solvent, and the solvent is included at 10 wt % to 80 wt % based on a total content of the fluid.

* * * * *